H. T. THOMAS.
CHANGE SPEED GEARING.
APPLICATION FILED JUNE 11, 1914.

1,131,291.

Patented Mar. 9, 1915.
4 SHEETS—SHEET 4.

WITNESSES

INVENTOR
Horace T. Thomas
BY
Palzemond H Parker
ATTORNEY

UNITED STATES PATENT OFFICE.

HORACE T. THOMAS, OF LANSING, MICHIGAN.

CHANGE-SPEED GEARING.

1,131,291.  Specification of Letters Patent.  Patented Mar. 9, 1915.

Application filed June 11, 1914. Serial No. 844,398.

*To all whom it may concern:*

Be it known that I, HORACE T. THOMAS, a citizen of the United States, residing at Lansing, county of Ingham, State of Michigan, have invented a certain new and useful Improvement in Change-Speed Gearing, and declare the following to be a full, clear, and exact description of the same, such as will enable others skilled in the art to which it pertains to make and use the same, reference being had to the accompanying drawings, which form a part of this specification.

Figure 1:
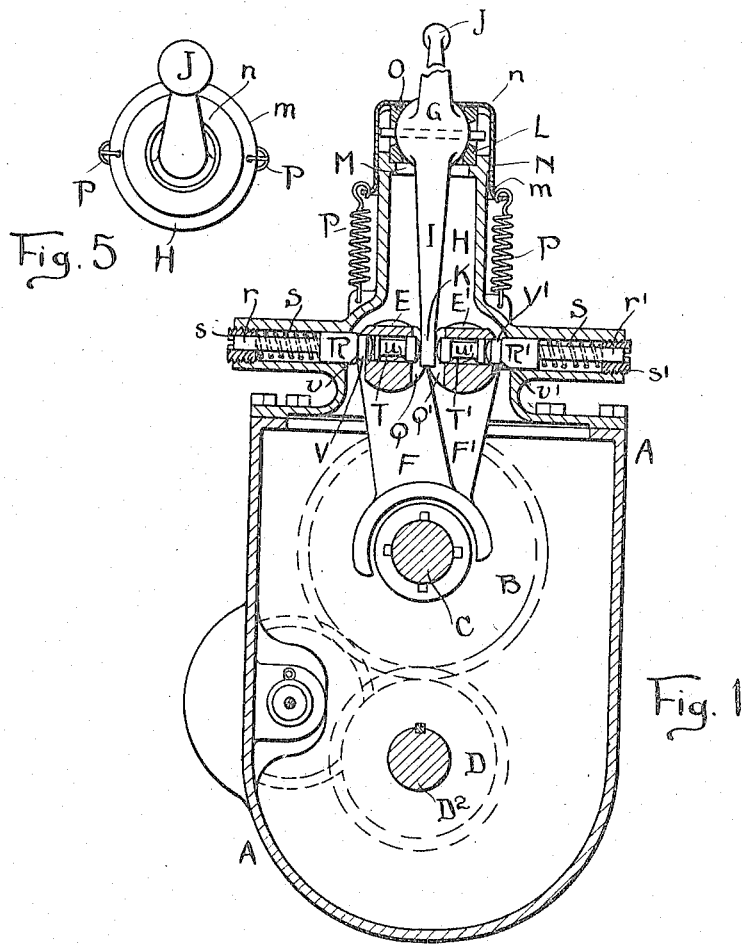
Figure 2:
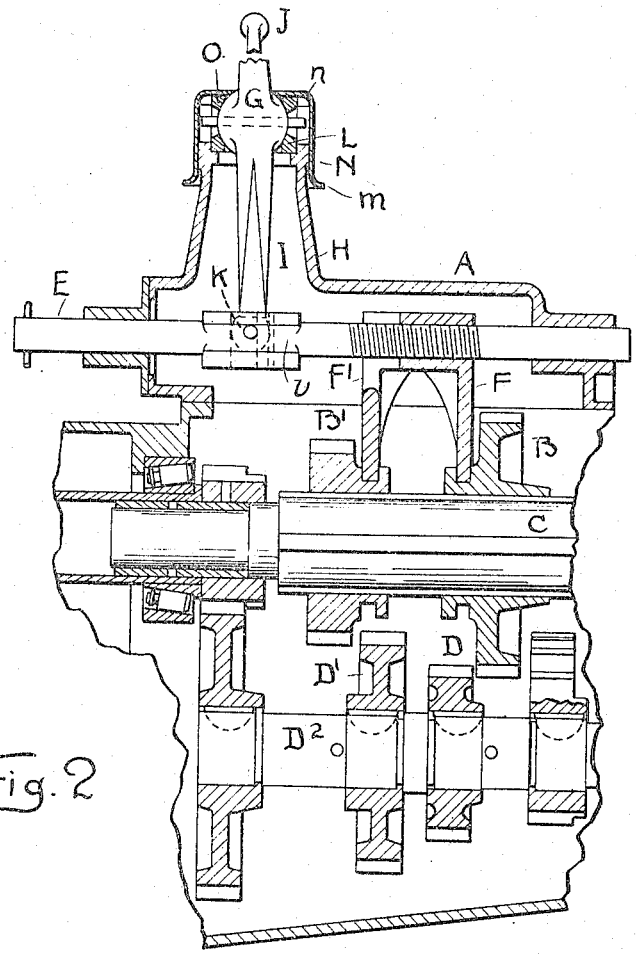
Figure 3:
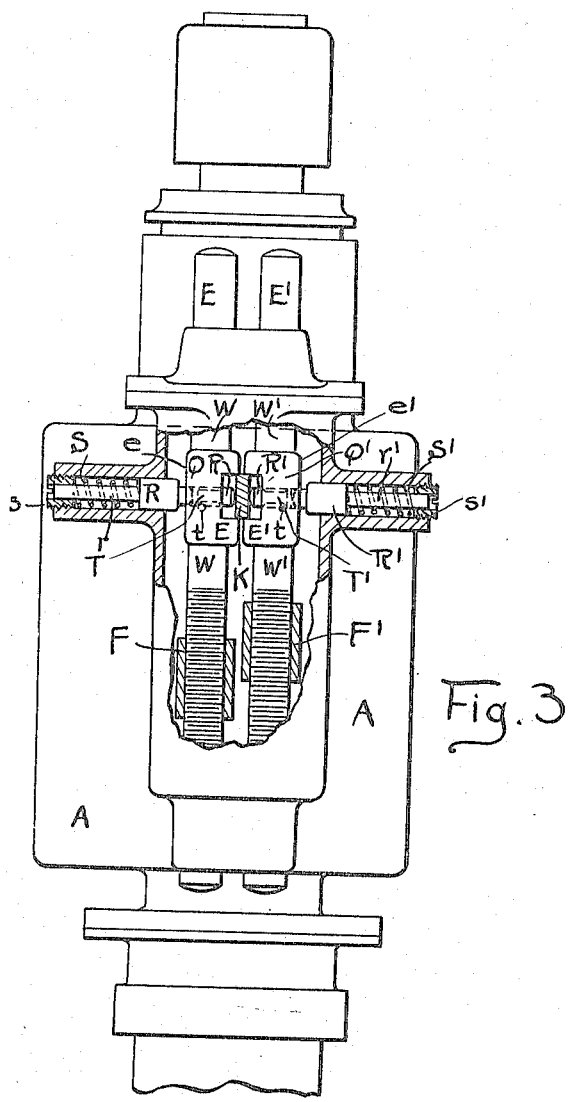
Figure 4:
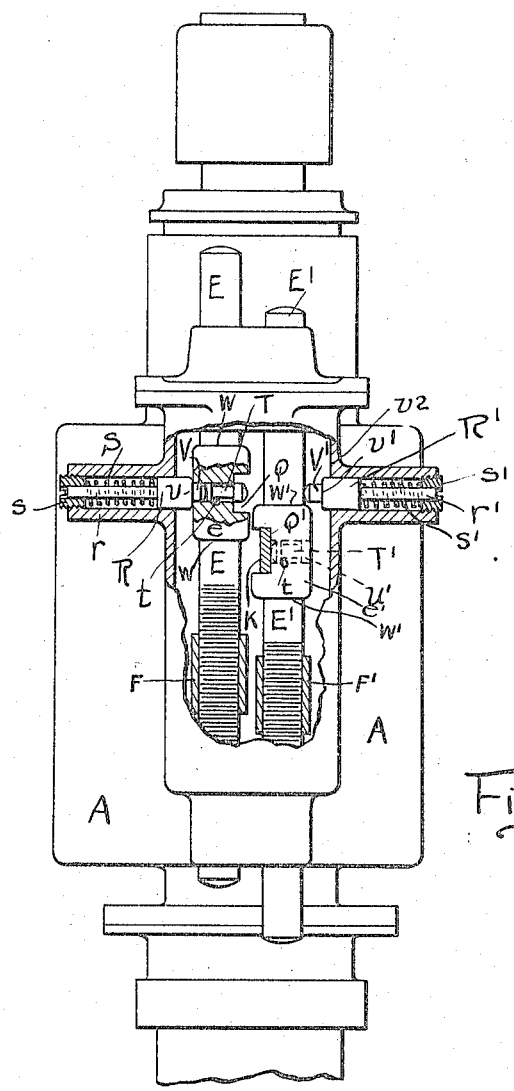

My invention relates to change-speed gearing for automobiles and an object of my improvements is to provide an improved adjusting apparatus for slidable change-speed gearing. I accomplish this object in the device illustrated in the accompanying drawings, in which, Figure 1 is a cross section of a change-speed gearing embodying my invention. Fig. 2, is a partial longitudinal section of the same. Fig. 3, is a plan view partly broken away and some parts being shown in section. Fig. 4, is a view similar to Fig. 3 showing a different adjustment of the parts. Fig. 5, is a detail plan view.

A, indicates the casing for the change-speed gearing.

B, $B^1$ are slidable gears upon the shaft C.

D, $D^1$ are gears upon the shaft $D^2$, with which the gear wheels B, $B^1$ are adapted to engage. This being a usual construction will not be described in detail.

E, $E^1$ are rods slidably mounted in bearings in the casing A, or an extension therefrom. The rods E, $E^1$ extend parallel to the shaft C and are adapted to be reciprocated longitudinally.

F, is a yoke fixed upon the sliding rod E and having its forked outer end engaging a groove in the hub of the gear B.

$F^1$, is a similar yoke engaging the gear $B^1$.

H, is an upward extension of the casing A.

GJI is a lever having the ball G at its center which fits in a socket in the upper end of the extension H from the casing A, thus forming a ball and socket joint which gives said lever freedom for universal angular movement. The arm J extends outside the casing and is adapted to be manipulated by the driver. The arm I extends within the casing, its lower end K coming between the rods E and $E^1$ for the purpose hereinafter described.

The upper end of the extension H is provided with an annular shoulder M upon which is seated a ring L having a portion of its upper surface formed into a zone of the surface of a sphere upon which surface the ball G fits and is adapted to turn. Above the ring L, engaging the upper part of the ball G, is a ring O similarly formed to the ring L.

N, is a sheet metal cap fitting over the extension H so as to be movable longitudinally thereof and having at its upper end an inturned portion $n$ which passes over and engages the upper surface of the ring O.

$m$ is an outwardly extending flange around the lower end of the cap N.

P, P are tension springs secured at their lower ends to lugs on the casing A, or an extension thereof, and at their upper ends engage the flange $m$. The springs P, P act to draw the cap N downward forcing the ring O against the ball G and holding the lever firmly in place with a yielding pressure.

The rings L O with the cap N, springs P, P and ball G form the ball-and-socket joint for the lever GJI.

At the center of the rods E, $E^1$ and in their adjacent inner sides are formed corresponding slots Q and $Q^1$, which are of such a shape that the lower end K of the lever GJI is adapted to fit and engage in said slots. When the slots Q and $Q^1$ are opposite each other the end of said lever may be moved into either of said slots to actuate the corresponding rod. When said slots do not register, as for instance in the position shown in Fig. 4, the end K of said lever is held in the slot in which it is engaged by the surface of the other rod.

Cylindrical apertures, U, $U^1$ are formed transversely through the rods E, $E^1$ so that they open at the centers of the slots Q and $Q^1$. In the apertures U, $U^1$ are fitted pins T, $T^1$ which have ends fitting said apertures and are reduced in diameter intermediate their ends.

$t$, $t^1$ are cylindrical pins extending vertically into holes in the rods E and $E^1$ and coming within the apertures U, $U^1$ adjacent to the reduced portions of the pins T and $T^1$ so that the latter are prevented thereby from accidental displacement from their apertures.

$Rr$ and $R^1r^1$ are pins fitting and adapted to reciprocate in laterally extending apertures in the casing A, or an extension thereof. Said pins are provided with enlarged heads R and R¹ adapted to fit and reciprocate in their respective apertures and with smaller stems r, r¹ fitting and adapted to reciprocate in holes in plugs s, s¹ in the outer ends of the apertures in which said pins reciprocate.

S and S¹ are coiled pressure springs having their ends bearing respectively against the plugs s, s¹ and against the enlarged heads R and R¹ of said pins. When the rods E and E¹ are at their central position as shown for instance in Figs. 1 and 3, the rods Rr R¹r¹ and pins T and T¹ are axially in line with each other respectively as are also their respective apertures.

V, V¹ are extensions from the inner ends of the pins Rr, R¹r¹ having rounded inner ends contacting at their central position the outer ends of the pins T, T¹, and adapted to extend into the apertures U, U¹, respectively, to lock the rods E and E¹ in their central positions.

v, v¹ are shoulders adapted to strike against the outer surfaces of the rods E, E¹ respectively to limit the inward movement of the pins Rr R¹r¹.

e, e¹ are level raised surfaces at the outer sides of the rods E, E¹ upon which the inner ends of the pins Rr, R¹r¹ bear and slide when said rods are moved from their central positions.

W, W and W¹ W¹ are surfaces formed on the rods E, E¹ at the ends of the raised surfaces e, e¹. These surfaces are so formed as to fit the inner ends of the pins Rr and R¹r¹ when a rod E or E¹ is reciprocated to the limit of its travel. The springs S and S¹ press said pins against said surfaces so that by the resistance to movement of said rods thus occasioned the proper adjusted and locking position of said rods will be indicated to the operator (Fig. 4).

The operation of the above described apparatus is as follows: When the rods E, E¹ are at their central position and the lever GJI is vertical, the rods E and E¹ are both locked in their central positions as shown in Figs. 1 and 3 by the pins Rr and R¹r¹ extending into the apertures U, U¹. When said lever is turned laterally the lower end K of said lever is moved into one of the slots Q, Q¹ as for example into Q¹ (Fig. 4). The pin T¹ is pressed inward thereby forcing the pin R¹r¹ out of engagement with the rod E¹ so that by moving the lever GJI the rods E¹ may be reciprocated longitudinally, the inner end of the pin R¹r¹ sliding upon the surface e¹ of said rod until it engages a surface W¹ at one end of the travel of said rod, in which position the correct adjusted and engaging position is indicated by the engagement of said pin with said surface as above described. If the rod E¹ is again returned to its central position the end K of said lever may be moved into the other notch Q and the other rod reciprocated in the same way as just described with reference to the rod E¹.

What I claim is:—

1. In a change-speed gearing, the combination of the rods E and E¹ adapted to reciprocate in parallel adjacent paths, said rods having adjacent faces provided with slots Q, Q¹ adapted to register, a lever movable in a plane parallel to the motion of said rods and in a plane at right angles to the same, adapted to engage in one or the other of said slots, said rods having apertures U, U¹ therein extending transversely of the same, pins T and T¹ adapted to reciprocate in said apertures, stationary bearings, and pins Rr, R¹r¹ adapted to reciprocate in stationary bearings and engage in said apertures, a pin T or T¹ respectively being adapted to be actuated by said lever when moved toward the side of said pin to displace the pin Rr or R¹r¹ respectively from its aperture while permitting the other of said last mentioned pins to engage in the other of said apertures.

2. In a change-speed gearing, the combination of the rods E and E¹ adapted to reciprocate in parallel adjacent paths, said rods having adjacent faces provided with slots Q, Q¹ adapted to register, a lever movable in a plane parallel to the motion of said rods and in a plane at right angles to the same, adapted to engage in one or the other of said slots, said rods having apertures U, U¹ therein extending transversely of the same, pins T and T¹ adapted to reciprocate in said apertures, stationary bearings, and pins Rr, R¹r¹ adapted to reciprocate in stationary bearings and engage in said apertures, a pin T or T¹ respectively being adapted to be actuated by said lever when moved toward the side of said pin to displace the pin Rr or R¹r¹ respectively from its aperture while permitting the other of said last mentioned pins to engage in the other of said apertures, said rods being provided with surfaces e, e¹ for the pins Rr, R¹r¹ to travel on, said rods having the surfaces W W¹ at the ends of the surfaces e, e¹ adapted to be engaged by the pins Rr, R¹r¹.

3. In a change-speed gearing, the combination of the rods E and E¹ adapted to reciprocate in parallel adjacent paths, said rods having adjacent faces provided with slots Q, Q¹ adapted to register, a lever movable in a plane parallel to the motion of said rods and in a plane at right angles to the same, adapted to engage in one or the other of said slots, said rods having apertures U, U¹ therein extending transversely of the same, stationary bearings, and pins T and T¹ adapted to reciprocate in said apertures, pins Rr, R¹r¹ adapted to reciprocate in stationary bearings and engage in said apertures, a pin T or T¹ respectively being adapted to be actuated by said lever when moved toward the side of said pin to displace the pin R$r$ or R$^1r^1$ respectively from its aperture while permitting the other of said last mentioned pins to engage in the other of said apertures, said rods being provided with surfaces W and W$^1$ adapted to be engaged by the pins R$r$, R$^1r^1$, for the purpose described.

4. In a change-speed gearing, the lever GJI having a ball G at its center, a stationary ring L, a ring O, a cap N extending over the ring O and springs P, P drawing upon said cap to force the ring O against said ball and the ball against the ring L.

In testimony whereof, I sign this specification in the presence of two witnesses.

HORACE T. THOMAS.

Witnesses:
A. L. HORN,
HOMER L. HOYT